July 5, 1960   J. D. MITCHELL   2,943,630
CHAIN PROTECTOR FOR PEANUT PICKING MACHINE
Filed Aug. 1, 1958
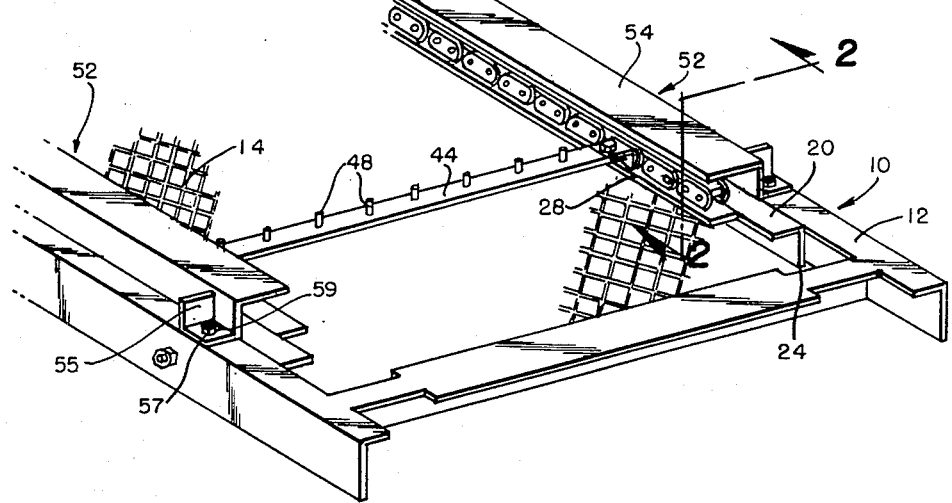
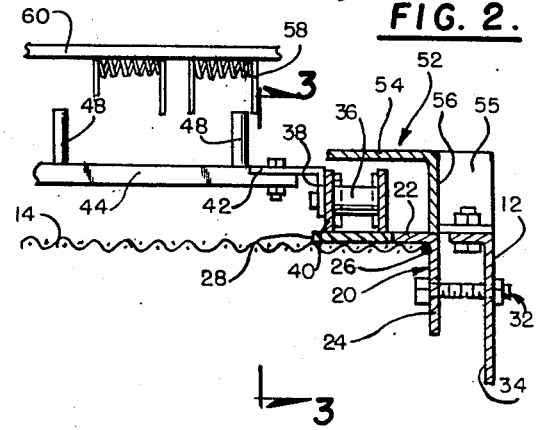
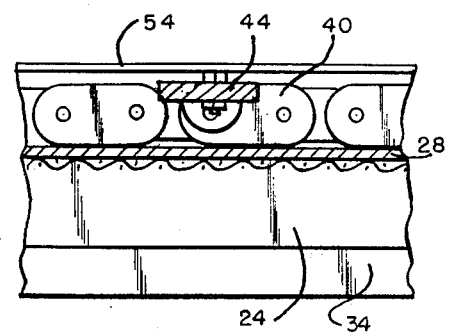
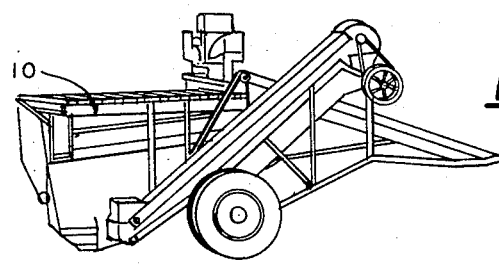
INVENTOR
John D. Mitchell
BY
ATTORNEYS

United States Patent Office 2,943,630
Patented July 5, 1960

2,943,630

CHAIN PROTECTOR FOR PEANUT PICKING MACHINE

John D. Mitchell, Woodville, N.C., assignor to Harrington Manufacturing Company, Inc., Lewiston, N.C., a corporation of North Carolina Filed Aug. 1, 1958, Ser. No. 752,495

3 Claims. (Cl. 130—30)

This invention relates to agricultural harvesters, and in particular for a protecting device in a peanut harvesting machine for preventing damage to the picking chains and associated structure and for insuring proper continuous operation of the harvester.

Peanut harvesting devices such as peanut pickers and combines have been in use for many years. These machines embody a means for separating the peanuts from the vines by severing the stems. In the form of these machines to which the instant invention most particularly relates, a screen is transversed by a chain having picker arms or bars. The latter serve to move the peanut vine structure over the screen and the peanuts, through the influence of gravity, tend to fall through the openings in the screen. The stems are severed due to the forward movement of the vines over the top of the screen with the peanuts depending below the screen. This is referred to as the chain carding system, the severing operation being in the nature of a carding of the peanuts from the vines. Although such a system has met with substantial commercial acceptance and is usually preferred, many thousands of units having been sold, the system has not been entirely satisfactory from the standpoint of maintenance and repair. Under certain conditions the carding chain and bars and picking chain are subject to breakage. For example, clogging will result in twisting and breaking of the bars or the attachment links by which the bars are connected to the chains.

All prior pickers have been plagued with this breakage and maintenance problem, particularly under certain harvesting conditions, such as with wet vines or heavy entanglements. Although this problem has been known for many years no one has, prior to my invention, adopted any satisfactory solution to it. In fact this has been a problem for at least twenty years. As a result manufacturers have tried different types of steels in the chains; malleable iron, cast iron and steel chains have been used. Some specially machined steel roller chains have been employed which were two and three times as expensive as those previously used and required special close fitting sprockets but still the breakage was encountered. The breakage is primary due to a jamming under the first few feet of the picking tops of the harvesting machines. Unavoidably from time to time excessive amounts of vines will pile up at this point. This causes the chains to jump and twist.

Furthermore, these wads of vines which would jam the machine were apt, even if they did not create damage to the machine structure, to be carried along beneath the picker bars and be tumbled along the screen. This would result in poor picking and cracking and shelling of the peanuts. Of course, this is undesirable.

An object of my invention is to provide peanut harvesting machines, employing the chain carding system, wherein this damage to the machinery and the poor picking is eliminated. According to my invention breakage of the picking bar pins, twisting of the picker bars, permanent deformation of the bars and breaking of the attachment flanges of the chains and the chain itself are no longer a constant threat to continued harvesting of the crop.

For maximum efficiency the picker bars in the chain carding system must move closely over the screen. This will insure the greatest number of peanuts falling through the screen. Accordingly a further object of the invention is to provide means as set forth in the preceding object without decreasing the normal operating efficiency of the machine.

The harvesting equipment in which the instant invention is employed is relatively expensive as compared with a simple hay baler, for example, and adaptation of improvements might result in increased costs of the machine as well as high manufacturing changeover costs. Accordingly another object of my invention is to provide improvements, as set forth in the preceding objects, which are adaptable to peanut harvesters without high manufacturing changeover costs, and without increasing to any substantial extent the cost of the machine.

A further object of the invention is to provide a peanut carding screen structure embodying protector tracks accomplishing the heretofore mentioned objects which can be supplied for use in the machines as integral units requiring no modification of the frame structure of the machines.

A further object of the invention is to provide screen attachment means cooperative with picker chain slides and picker screens, together with a chain protector structure, insuring proper operation of the picking portion of the harvester with the minimum amount of damage or disruption through operation.

A further object of the invention is to provide a relatively simple solution for the heretofore mentioned problems which is readily adaptable to known successful harvesting equipment.

These and other objects and advantages will become apparent from the following description and the accompanying drawings, wherein:

Figure 1 is a perspective view of a chain carding system constructed in accordance with the invention.

Figure 2 is a sectional view taken along line 2—2 of Figure 1.

Figure 3 is a sectional view taken along line 3—3 of Figure 2.

Figure 4 is a perspective view of a picker showing the location of the carding apparatus.

Peanut pickers and combines, like many other harvesting devices, are useful during relatively short periods of the year. However, when they are needed it is essential that they operate continuously during the harvesting period. Even machines which have been highly successful from the standpoint of sales over many years and which are useful for peanut harvesting have, however, been plagued with breakage problems requiring not only expensive repairs but necessitating delays in the harvesting process often resulting in hasty repairs. With the increasing cost of labor breakdowns are becoming even more serious in their consequences. Despite these factors and the known tendency of these picking devices to break down at the most inappropriate times, no one has heretofored evised a solution. After much experimentation, however, the instant invention has been devised.

Referring now to the drawings:

The chain carding system 10 comprises a frame 12 formed of angle iron. This frame 12 is adapted to be attached to the machine frame of the harvester or can be provided as an integral part thereof. Within the frame 12 there is provided the carding system components consisting of the screen 14. The latter in some instances will consist of a hex or diamond shaped mesh screen which can be formed of expanded metal and will have openings of about 2" x 3". The picking operation is achieved by dragging the vines across the screen. The compound motion of the peanuts is thus forward across the machine and downward through any opening over which the peanuts may pass. As a result the peanuts will extend below the screen while the vine itself is being dragged along the upper surface of the machine. Accordingly the screen openings will serve to sever the stems from the peanuts. The peanuts will fall below the screen and the vines will continue along the screen and be dropped off at the end. The vines are dropped on the screen 14 by a picker cylinder or cylinders (not shown). Often wads or bunches are dropped and this is one source of the jamming and resulting damage previously experienced.

The picking screen has its longitudinal edges attached to an angle adjustment bar and screen frame member 20. The latter is formed as an angle iron and has an upper horizontal leg 22 and a depending vertical leg 24. The screen 14 extends under the horizontal leg 22 and abuts the vertical leg 24. The screen is tack-welded as at 26 at spaced points to the horizontal and vertical legs of the frame member 20. A slide 28 abuts the horizontal leg of the frame member and the upper surface of the screen. The slide is tack-welded to the upper leg 22 of the frame 20. The screen frame has longitudinally spaced openings and bolt and nut assemblies 32 extend therethrough. These assemblies also extend through the vertical leg 34 of the frame 12. It is apparent that the nut and bolt assemblies can be used to tension the screen assembly. Roller chains 36 of a width conforming to the slides 28 are adapted to slide along the latter. These chains have brackets 38 attached to the links 40 at spaced intervals along the length of the chain.

In a preferred construction the brackets 38 are formed as integral parts of links insertable at spaced intervals along the chain in place of the normal or more usual links. The brackets have a horizontal leg 42 extending over the screen.

Picking bars 44 extend over the screen laterally thereof from one chain to its opposite chain. These bars are attached to the horizontal legs 42 of the brackets 38 by pins 46. The bars extend approximately ¼" above the screen in the preferred embodiment although this figure is mentioned only to illustrate the problems involved in devising a suitable protection device. As the bars are raised above the screen, the efficiency of the pickers lowers.

The picking bars can be square edge steel bars as illustrated in the drawings. Picking bar pins 48 are attached to the bars usually by riveting. These pins are often referred to as fingers. They are spaced along the upper surface of the bars.

An angle member 52 having an upper horizontal leg 54 and a vertical leg 56 is attached to the angle member 20 preferably with vertical leg 56 in alignment with vertical leg 24.

Angles 55 are welded to the angles 52 along each side of the screen. The angles 55 are connected to the vertical legs 56 and extend outwardly from the latter. Angles 55 have one leg at right angles to leg 56 and their other legs 57 are horizontally disposed. Legs 57 rest on frame 12. Slots 59 in legs 57 receive bolts which extend through the horizontal leg of frame 12. This structure supports the screen while bolts 32 serve as tensioning means for the screen.

The horizontal leg 54 extends over the chains being spaced therefrom a distance of ⅝". As an indication of the relative size of the elements in the preferred embodiment described, vertical leg 56 is 1½" high, the horizontal leg is 2" across and the members are 3/16" thick. The slides are tack-welded to the frames 20 and are removable for easy replacement.

Above the picking screen there are provided spring fingers 58. These are supported on spaced bars 60 extending laterally across the screen. These bars are attached to the frame of the picker or combine. These spring finger members have the purpose of maintaining the vines in contact with the screen. The picking screen assembly and the fingers 58 comprise the picking-top of the machines.

The simple construction disclosed results in a close fitting picking bar, that is, close fitting with respect to the screen, having a protector device for the chains, and in a screen combination readily insertable in pickers and adjustable therein. The protector 54 prevents twisting and jamming of the chain and results in a smooth uniform carefree operation at high efficiency. Wads or bunches of vines will not be simply rolled over underneath the bars, nor will there be twisting and breaking of the bars, fingers and chains as in the heretofore known structure. Yet the simple protection affording construction embodying the paired angle members and slides forming a single unit frame for supporting and adjusting the side of the screen is obviously a construction which provides maximum strength and support for the screens, as well as the heretofore thought impossible to achieve protection for the chain and its associated elements.

The instant construction embodied in peanut pickers has resulted in operation of entirely satisfactory nature even in conditions which were purposely worsened to test the structure. Picking under conditions which were known to damage the heretofore constructions has been readily accomplished without damage through use of the instant invention.

While I have shown and described the preferred form of my invention, it will be apparent that many changes in details and form can be made and therefore I claim an exclusive right to all modifications and changes in form coming within the scope of the appended claims.

I claim:

1. In a peanut picking device, a frame, a picking screen, said screen having peanut receiving openings, said openings being defined in part by stem severing members, said screen being disposed substantially in a single plane, an angle member extending along one of the edges of said screen, said screen being connected to said angle member with one leg of said angle member extending over and parallel to an edge of said screen, means on said angle member for tensioning said screen, a slide member removably connected to said screen and abutting the upper surface of said screen, said slide member also abutting said one leg of said angle member, a picking chain slidably engaging the upper surface of said slide, picking bars extending horizontally over said screen and attached to said chain, picking bar pins or fingers extending vertically above said bars and adapted to urge peanut vines along said screen, spring fingers positioned above said bars and attached to said harvester frame, said spring fingers extending downwardly toward said screen and being adapted to urge said vines and said bars and connected chains downwardly toward said screen, a chain protector for regulating the movement of said chain laterally of the chain contacting surface of said slide comprising a second angle member connected to said first mentioned angle member, said second angle member having a first leg extending substantially parallel to the vertical leg of the first mentioned angle member, and a second leg extending over the horizontal leg of the first mentioned angle member and said slide, the latter leg of said second angle member being positioned above and immediately adjacent said chain.

2. In a peanut picking device, in combination, a picking screen assembly comprising a screen, said screen having peanut receiving openings defined in part by stem severing portions, said screen having longitudinal edges, an angle member extending along each of the latter edges of said screen, said screen being connected to each angle member with one leg of each angle member extending over and parallel to the screen, means on at least one of said angle members for tensioning said screen, a second angle member attached to each of the first mentioned angle members, each second angle member having a horizontal leg extending substantially parallel to the horizontal leg of said first mentioned angle member and spaced therefrom, slide members, each of said slide members abutting an edge of one of the horizontal legs of said first mentioned angle members and resting on said screen, said slide members having upper slide surfaces, said surfaces being below the horizontal legs of said second mentioned angle members and in facing relationship with the latter legs respectively, said slide members and the latter legs forming chain-receiving pockets adapted to slidingly receive a chain in bearing relationship to said slides and in spaced relationship to the latter legs, the latter legs forming a means of limiting movement of the chains above said slides toward said legs.

3. In a peanut picking device, a frame, a picking screen, said screen having peanut receiving openings, said openings being defined in part by stem severing members, said screen being disposed substantially in a single plane, an angle member extending along one of the edges of said screen, said screen being connected to said angle member with one leg of said angle member extending over and parallel to an edge of said screen, means on said angle member for tensioning said screen, a slide member connected to said screen and abutting the upper surface of said screen, said slide member also abutting said one leg of said angle member, a picker chain slidably engaging the upper surface of said slide, picking bars extending horizontally over said screen and attached to said chain, picking fingers extending vertically above said bars and adapted to urge peanut vines along said screen, spring fingers positioned above said bars and attached to said harvester frame, said spring fingers extending downwardly toward said screen and being adapted to urge said vines and said bars and connected chains downwardly toward said screen, a chain protector for regulating the movement of said chain laterally of the chain contacting surface of said slide comprising a second angle member connected to said first mentioned angle member, said second angle member having a first leg extending substantially parallel to the vertical leg of the first mentioned angle member, and a second leg extending over the horizontal leg of the first mentioned angle member and said slide, the latter leg of said second angle member being positioned above and immediately adjacent said chain.

References Cited in the file of this patent

UNITED STATES PATENTS

| | | |
|---|---|---|
| 1,479,055 | Crow et al. | Jan. 1, 1924 |
| 2,314,879 | Heller | Mar. 30, 1943 |
| 2,882,909 | Goodlad | Apr. 21, 1959 |